May 28, 1968 D. P. COFFIN, JR., ETAL 3,385,970
NONRECIPROCAL SIGNAL COUPLING APPARATUS USING OPTICAL COUPLING LINK IN WAVEGUIDE OPERATING BELOW CUTOFF
Filed Dec. 18, 1964 2 Sheets-Sheet 1

INVENTORS
DAVID P. COFFIN, JR.
ARCADY B. IWASKIW
BY
Allen M Sutton
ATTORNEY

INVENTORS
DAVID P. COFFIN, JR.
ARCADY B. IWASKIW
BY
Allen M. Sutton
ATTORNEY

United States Patent Office 3,385,970

Patented May 28, 1968

3,385,970

NONRECIPROCAL SIGNAL COUPLING APPARATUS USING OPTICAL COUPLING LINK IN WAVEGUIDE OPERATING BELOW CUTOFF

David P. Coffin, Jr., Towson, and Arcady B. Iwaskiw, Baltimore, Md., assignors to The Bunker-Ramo Corporation, Stamford, Conn., a corporation of Delaware Filed Dec. 18, 1964, Ser. No. 419,401
9 Claims. (Cl. 250—199)

This invention relates to improvements in signal coupling apparatus and more particularly to improved apparatus having enhanced frequency selective signal transmission properties providing a bilaterally high attenuation of undesired electromagnetic energy between an input and an output terminal thereof while at the same time permitting the excellent unilateral coupling of desired electrical signal intelligence from said input terminal to said output terminal.

There are many instances when it is desired to transmit or couple electrical signal intelligence from one physical location to another while at the same time providing a high attenuation of or virtual shielding against the transmission of spurious electromagnetic signals from the latter location to the former location. For example, in the case of a shielded enclosure sometimes in the form of a so-called "screen room" in which electronic devices are often tested, it is frequently desirable to provide means for communicating data derived from a device being tested within the screen room to a point outside the room for monitoring purposes. On the other hand, spurious signals conditionally present in the environment outside the room must be prevented from entering the room and possibly affecting sensitive equipment and measurements. Similarly, it may be desired to effectibely couple an electrical signal from a position outside the shielded room to a terminal inside the room for controlling apparatus therin. Again spurious signals originating from the outside environment should be prevented from entering the room.

Typically, in the past where a transmission line has been employed to couple signals from within to without a shielded room, the elimination of spurious or undesired signals has been partially accomplished by the use of filters in the signal transmission line. This is not entirely satisfactory, however, because filters are basically bilateral devices; that is, a filter will conduct in either direction and will not prevent undesired signals from being passed if they are within the frequency pass band of the filter.

Recently, advances have been made possible in the field of signal coupling devices by the development of improved solid state electro-optical emitters and sensors. A desired signal representing intelligence can be caused to modulate the emission of a photo-emitter which is optically coupled to energize a photo-sensor. Such an arrangement makes possible a high direct current galvanic isolation between the two devices, but it does not provide extremely high isolation as regards electromagnetic signals because of capacitive coupling between the devices and the absence of adequate electromagnetic shielding.

Accordingly, it is a primary objective of the present invention to provide a device that permits the coupling of electrical signal intelligence from an input terminal to an output terminal, both of which are galvanically isolated from one another and between which there exists a high degree of bilateral electromagnetic isolation.

In accordance with the present invention, advantage is taken of the fact that a tubular electromagnetic waveguide so dimensioned as to be below cut-off at frequencies embraced by practically all spurious signals which are detrimental to the operation of a given electronic signal utilization system may at the same time be adapted to freely communicate electro-optical energy (corresponding to signal frequencies to which the system is not deleteriously responsive), and that this electro-optical energy may, in turn be modulated to selectively transmit through the wave guide desired signal intelligence defined by signal components having frequencies below the cutoff frequency of the waveguide and hence which would otherwise be attenuated thereby.

More particularly, in accordance with the teachings of the present invention, a waveguide is used to provide the aforementioned desired electromagnetic isolation while simultaneously providing a light transmission path between a photo-emitter and a photo-sensor, over which path desired signal intelligence is communicated. The waveguide is specifically dimensioned to provide maximum attenuation to extraneous electromagnetic signals that might otherwise be transmitted therethrough, and yet provide an excellent transmission path for electro-optical energy transmitted between the photo-emitter and photo-sensor located at opposite ends of the waveguide. The waveguide is so constructed that it can be conveniently mounted through a wall which defines at least in part a shielded compartment or other isolated area. Furthermore, in one embodiment of the invention, a plurality of such waveguides are packaged as a single unit for providing a plurality of signal transmission paths, while providing electromagnetic isolation from spurious signals.

An important feature of the invention in one of its preferred embodiments is that the waveguide is made substantially integral with a plate of ferrous material or other material having a relatively high magnetic permeability and substantial electrical conductivity. This plate may then be used as the interface between the two compartments between which selective signal transmission is to be effected.

In another arrangement, the plate comprises a transverse wall which divides a housing into two parts with the waveguide projecting through the wall. The housing is adapted to house input and output circuitry for the photo-emitter and photo-sensor in the isolated chambers on each side of the transverse dividing wall. Thus, a desired degree of electromagnetic isolation is provided between the two chambers, while at the same time permitting desired signal communication therebetween.

As used herein, the term "electro-optical energy" means electromagnetic energy falling in the visible or near-visible spectrum, that is, infrared, visible and ultraviolet light, as opposed to lower frequency electromagnetic radiation.

In another form of the invention wherein it is desired to selectively couple intelligence in the form of binary signals, spurious signal isolation is further enhanced by providing for the photo-emitter and photo-sensor respective drive and output amplifiers which have a signal threshold and signal limiting characteristic. This latter characteristic is preferably afforded by ensuring that the peak amplitude excursion of the binary signal causes saturation of both amplifiers.

Further features and advantages of the invention will become apparent from the following description, taken in conjunction with the accompanying drawings, in which FIGURE 1 is a simplified diagrammatic view illustrating the basic principles of the invention:

Figure 1:
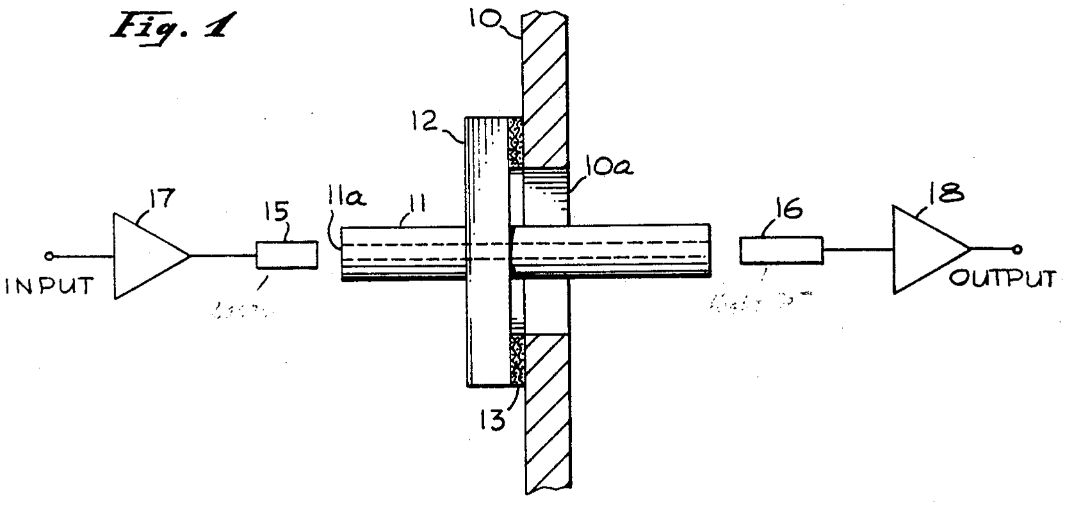

FIG. 1 illustrates in diagrammatic form a simplified coupler constructed in accordance with the invention. It is shown in conjunction with a wall 10 of a shielded compartment or room. The wall 10 has an opening 10*a* through which the coupler extends.

The coupler comprises a metallic waveguide 11 having a flange 12 for mounting the coupler on the wall 10 by conventional means such as screws (not shown). The waveguide 11 may conveniently be circular in cross-section and, of course, has an axially extending opening or bore 11*a*. As noted, the waveguide 11 is secured to the wall by means of the flange 12, and a gasket 13 is interposed between the flange and the wall to prevent any leakage of radio frequency energy around the flange and into the shielded compartment. A suitable gasket material is, for example, manufactured and sold by Metex Electronics Corporation, Clark, New Jersey, and comprises a metallized mesh material. The waveguide 11 and the aforementioned structure associated therewith comprises closure means for the opening 10*a* in respect of electromagnetic radiation as described more fully hereinafter.

The waveguide 11 is designed according to well known principles to provide high attenuation of electromagnetic signals having frequencies below a desired cut-off frequency. In practice, the waveguide can be designed to provide over 100 decible attenuation to extraneous signals from zero frequency to those as high as 25 gigacycles, or even higher. The dimensions of the waveguide, that is, length and bore diameter, necessary to obtain various cut-off frequencies can be readily determined from available literature. For example, the theory and various formulae for determining cut-off frequencies are explained in books entitled "Principles and Applications of Waveguide Transmission" by George Southworth, "Reference Data for Radio Engineers" published by International Telephone and Telegraph Corporation, and "Antenna Engineering Handbook" by Jasik. By way of example, however, a waveguide of cast iron having a cylindrical air-filled aperture .2" in diameter and 1⅝" long will have a cut-off frequency at the lowest mode of propagation ($TE_{11}$) of 35 gigacycles. As later described, when, for the purposes of the present invention, the aperture is filled with a solid, relatively low dielectric light conducting tube or fiber optics array having a relative dielectric constant of approximately 2.5, the cut-off frequency of such a waveguide is lowered to approximately 24 gigacycles. Since most practical electronic signal utilization systems are not responsive to signal frequencies above 10 gigacycles, and such waveguide configuration offers over 100 db attenuation at its cut-off frequency, it can be seen that the waveguide provides an effective electromagnetic signal isolation means. In fabricating the housing, a cast grey iron is suitable, such as ASTM 848 Class 30, as set forth in ASTM Standards.

Coupling of a desired signal through the waveguide is provided by a source 15 of electro-optical energy (a photo-emitter) located adjacent to or in one end of the waveguide 11 and a sensor 16 of electro-optical energy (a photo-sensor) located adjacent to or in the opposite end of the waveguide. The source 15 is provided with signals from an input circuit 17, and signals from the sensor 16 are supplied to an output circuit 18, both of which circuits will be described in some detail hereinafter.

The source 15 may conveniently be comprised of a gallium arsenide diode, the intensity of radiation from which is controlled by the amplitude of an input signal supplied to the diode. By way of example, such a photo-emitter may be a diode known as type MS–7000 which is manufactured and sold by Micro State Electronics Corporation, Murray Hill, N.J. The sensor 16 for the electro-optical energy emitted by the source 15 may be a silicon phototransistor, such as type 2N2452 made and sold by Fairchild Camera and Instrument Corporation, Semiconductor Division, Mountain View, Calif. The foregoing examples of suitable source and sensor elements are illustrative only, and, of course, other functionally equivalent elements may be used.

It is now apparent that the invention provides a signal coupling device that permits signals to be optically coupled therethrough, but which virtually completely attenuates electromagnetic signals having frequencies below a desired high frequency cutoff. It is also pointed out that attenuation of spurious or undesired signals is effective for propagation through the waveguide in either direction. As more fully described hereinafter, however, in some instances the effective degree of attenuation of such signals is not as great in the direction from input to output as it is from output to input. This comes about by reason of spurious electromagnetic signals at the input end of the signal coupler actually inducing spurious signal currents into the circuits driving the photo-emitter or the photo-emitter itself.

This effect is, however, minimized in accordance with the present invention by selecting a photo-emitter device which has a low internal impedance and positioning the device well into the waveguide so as to effect substantial electromagnetic shielding thereof. Where binary information is to be coupled in the manner previously described, this effect may, in accordance with the invention, be further minimized by imparting a minimum amplitude threshold characteristic to each amplifier serving the photo-emitter and photo-sensor and further adapting each amplifier so that in response to maximum amplitude excursions of the binary signal the amplifiers are driven into a condition of saturation.

Figures 2, 4:
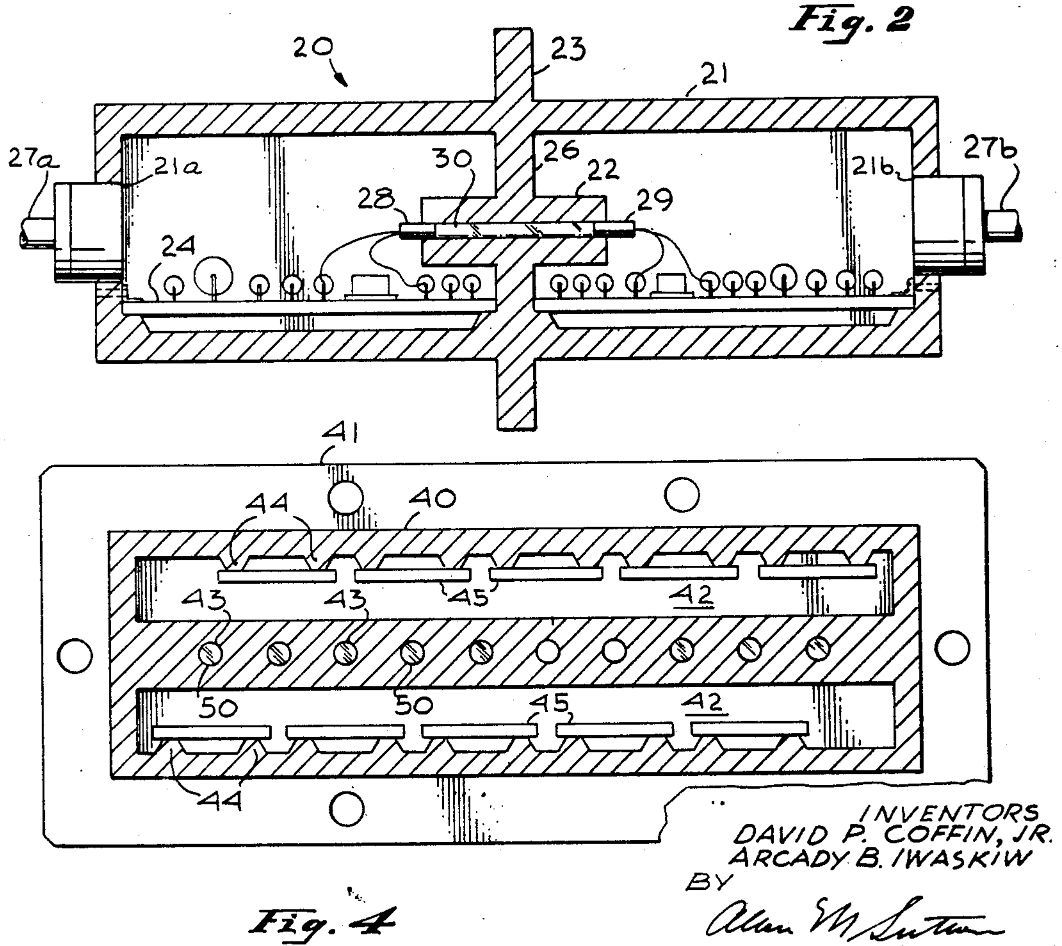
FIG. 2 is a longitudinal sectional view of a single coupler constructed in accordance with the invention.
FIG. 4 is a sectional view of the unit shown in FIG. 3 taken on the line 4—4 of FIG. 3.

FIG. 2 illustrates a practical embodiment of the invention in which a single casting provides an integral combination of a housing, a waveguide, and a mounting flange which together constitute closure means for an opening such as 10*a* in FIGURE 1. The casting, indicated generally by the numeral 20, includes the housing 21, the waveguide 22, and the mounting flange 23. The housing also includes means such as pads for supporting an input circuit board or structure 24 within one part of the housing, and an output circuit board in another part of the housing, the two parts or compartments being separated by a wall or partition 26 cast integrally with the other portions. Access to the interior of the housing 21 is provided through apertures 21*a* and 21*b* formed in opposite ends of the housing. Conduits 27*a* and 27*b* provide means for making electrical connections to the circuit boards 24 and 25, respectively. Suitable fittings, not shown, are provided on opposite ends of the housing 21 for the conduits.

As mentioned, the waveguide 22 is preferably cast integrally with the housing 21 and is dimensioned as previously described to provide a desired cut-off frequency for electromagnetic radiation. At the input end of waveguide 22, a photo-emitter 28 is mounted within the bore of the waveguide, and a photo-sensor 29 is similarly mounted at the other end of the waveguide. The photo-emitter and photo-sensor are, of course, connected to their respective circuit boards by appropriate electrical leads, while the waveguide itself effects a degree of electromagnetic shielding around the photo-emitter for the purpose previously described.

In a preferred form of the invention, the interior of the waveguide 22 is provided with light pipe means to enhance the transmission of electro-optical energy between the photo-emitter 28 and the photo-sensor 29. Such means may take the form of a Lucite rod 30 or other means such as fiber optics. The relative dielectric constant of such material within the waveguide must, of course, be taken into account in designing the waveguide for a specific cut-off frequency.

Inasmuch as the waveguide 22 is integral with the housing 21, it is apparent that the entire casting 20 is preferably made of a magnetic material such as, for example, iron or steel. The photo-emitter 28 and the photo-sensor 29 may be of the types previously mentioned in connection with FIG. 1.

Figure 3:
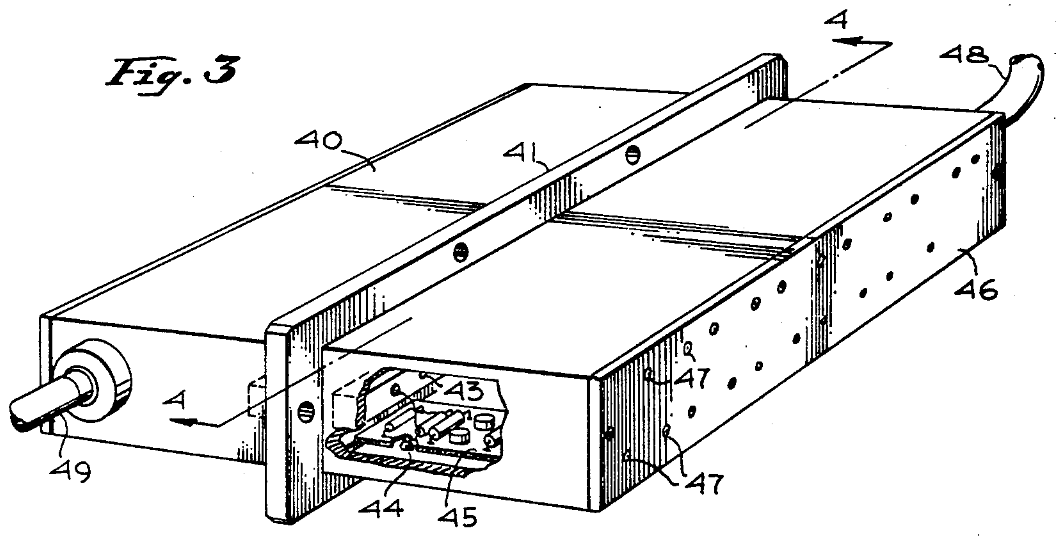
FIG. 3 is a perspective view, with portions broken away, of a unit embodying a plurality of couplers for providing a plurality of signal paths.

The coupler shown in FIG. 2 may be made as a single unit or a plurality of couplers may be packaged as a single unit for mounting purposes to provide a number of signal paths while requiring only a single opening through a wall of a shielded compartment or the like. FIGS. 3 and 4 illustrate such an embodiment comprising a plurality of signal couplers of the type contemplated by the present invention.

As in the embodiment previously described, an integral casting provides a housing 40, a mounting flange 41, a transverse dividing wall 42 that divides the housing into two parts, and a plurality of waveguides 43 that extend through the wall 42. Of course, pads 44 are provided to which input and output circuit boards 45 for each coupler are secured. In the embodiment shown in FIGS. 3 and 4, the ends of the housing are closed by cover plates 46 (only one of which is shown) secured to the housing by suitable means such as screws 47. Each waveguide is provided with a photo-emitter and a photo-sensor (which are not shown) of the types previously discussed and electrically connected to their respective input and output circuit boards. Electrical connections to the circuit boards are made from outside the housing 40 by means of a pair of conduits 48 and 49. Each waveguide may also contain light pipe means 50.

It will be apparent to one skilled in the art that many various arrangements of a plurality of coupling devices within a single housing are possible, although, as shown, the waveguides of ten couplers are arranged side by side with alternate circuit boards being above and below the waveguides. One of the principal advantages of the invention will not be realized, however, unless the waveguides are made substantially integral with the transverse wall intermediate the two enclosures defined by the housing so as to provide maximum isolation between input and output, so far as electromagnetic radiation is concerned. In the multiple-coupler unit, the waveguides are of course designed as previously discussed to provide attenuation of electromagnetic signals having frequencies below a desired cut-off frequency.

Figure 5:
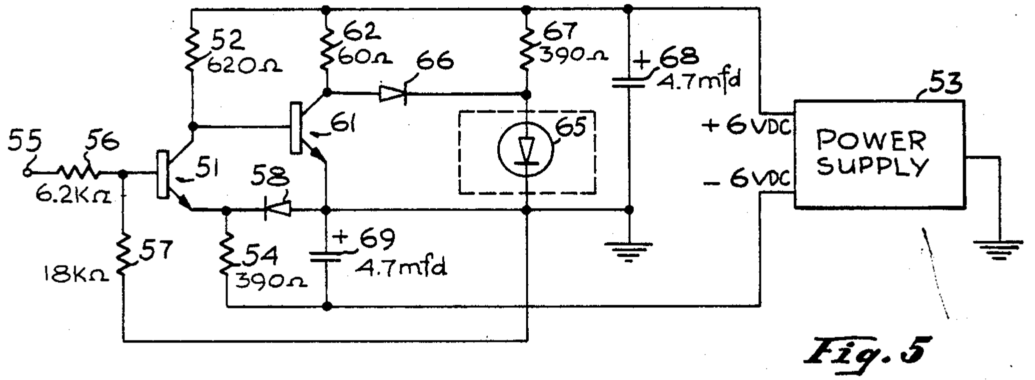
FIGS. 5 and 6 are schematic diagrams of suitable input and output circuitry, respectively.

FIG. 5 is a schematic diagram of a suitable input circuit (shown in FIG. 1 at 17) for a photo-emitter of the type described. As shown, the circuit comprises two stages of amplification followed by the photo-emitter which is mounted in the waveguide. The first stage of amplification includes an NPN transistor 51 having its collector connected through a resistor 52 to a power supply 53 which provides +6 volt direct current to the collector. The transistor 51 has its emitter connected through a resistor 54 to the power supply 53, from which it receives −6 volts direct current. A diode 58 isolates the emitter from a direct connection to ground. Input to the circuit is to a terminal 55 which is connected to the base of the transistor 51 through an input resistor 56. The transistor base is connected to ground potential through a resistor 57. Output from the first stage is taken from the collector of the transistor 51.

The second stage of amplification includes another NPN transistor 61, whose base is connected to the collector of the transistor 51. The emitter of the transistor 61 is grounded, and its collector is connected to the +6 volt supply through a resistor 62. The collector of the transistor 61 is also connected to the anode of a photo-emitter diode 65 through a diode 66. The anode of the photo-emitter 65 is connected to the +6 volt supply through a resistor 67, and its cathode is grounded.

As shown, a pair of capacitors 68 and 69 provide filtering of the +6 volt and −6 volt output voltages, respectively, of the power supply 53.

Input signals supplied from an external source (not shown) to the input terminal 55 are amplified by the two stages of amplification and utilized to modulate the anode current of the photo-emitter 65.

Figure 6:
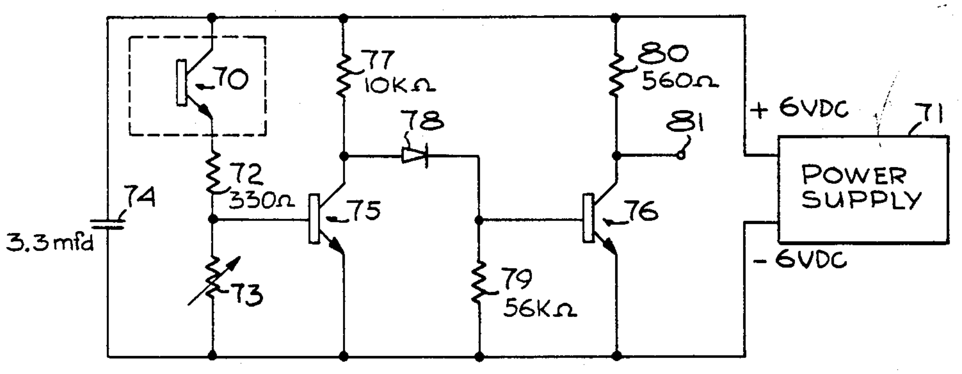

A schematic diagram of a suitable output circuit (shown in FIG. 1 at 18) is shown in FIG. 6. The circuit comprises a photo-transistor 70 followed by two stages of amplification. The collector of the photo-transistor 70 is connected directly to +6 volt direct current provided by a power supply 71. The emitter of the photo-transistor 70 is connected through a resistor 72 and a thermistor 73 to −6 volt direct current also provided by the power supply 71. A capacitor 74 is connected across the power supply 71 to provide filtering action.

The two stages of amplification include NPN transistors 75 and 76. The base of the first transistor 75 is connected to the juncture of the resistor 72 and the thermistor 73, its emitter is connected directly to the −6 volt supply, and its collector is connected to the +6 volt supply through a resistor 77. The photo-sensor is mounted in the waveguide and is connected to the remainder of the circuitry by electrical leads. The combination of the resistor 72 and the thermistor 73 in the emitter circuit of the photo-sensor provides compensation for ambient temperature variations that might cause variations in gain of the output circuitry. In the particular circuit shown, the thermistor 73 may be type B832003P/330K, manufactured by Ferroxcube Corporation of America, Saugerties, New York. Of course, a fixed resistor may be used instead of a thermistor, if compensation for temperature variations is not required.

The collector of the first transistor 75 is connected through a diode 78 to the base of the second transistor 76, which is also connected to the −6 volt supply through a resistor 79. The emitter of the transistor 76 is connected directly to the −6 volt supply, and its collector is connected through a load resistor 80 to the +6 volt supply. The output is taken from the collector of the transistor 76, which is connected to an output terminal 81.

The output of the photo-sensor 70 varies in response to variations in the electro-optical energy incident thereon, which energy has been transmitted through the waveguide from the photo-emitter. The output of the photo-sensor is amplified and provided to the output terminal 81.

Attention is particularly drawn to the fact that two power supplies are used, one for the input circuitry and another for the output circuitry. If a common power supply were used for both circuits, it is possible that spurious signals might be coupled from the input to the output of the coupler through common power supply impedances or by transmission over the power supply leads from input to output. With two power supplies, all electrical connections between input and output may be avoided to provide maximum isolation.

As will be seen from a study of the signal input and output circuitry described above with the exemplary values of circuit components shown, maximum isolation between input and output terminals as regards spurious signals during the transmission of binary intelligence is afforded. This, in accordance with the present invention, is achieved by ensuring that the peak-to-peak amplitude of the binary signal applied to the input terminal 55 of FIG. 5 is in excess of 1 volt with the voltage at the input terminal 55 corresponding to a logical 0 being in excess of −½ volt. Under these conditions, certain transistors in both input and output amplifiers will be in a cut-off or saturation condition for a logical 0 input signal condition and likewise for a logical 1 input signal condition. Thus any low level spurious signal currents which may be introduced into the input amplifier circuitry and photo-emitter 65 will not be communicated to the output terminal 81 of the output amplifier shown in FIG. 6.

The transistors 51, 61, 75, and 76 shown in FIGS. 5 and 6 may all be of the 2N2369A type, or alternatively of the 2N3648 type. It is apparent that PNP rather than NPN transistors may be used by changing the polarities of the supply voltages in a well known manner. The circuit values shown are representative only, and not to be construed as in any sense restrictive.

It is now apparent that the invention provides an electromagnetic coupler that is extremely efficient. It is based on the concept of simultaneously utilizing a waveguide to attenuate electromagnetic radiation and to serve as a path for electro-optical energy emitted by a photo-emitter at one end of the waveguide and received by a photo-sensor at the other end of the waveguide. The isolator may be packaged as a single unit or a plurality of them may be incorporated into a single package.

What is claimed is:

1. Apparatus useful for coupling signal intelligence from a first chamber to a second chamber, which chambers are substantially electromagnetically isolated from one another by an isolating wall of magnetic material and where there exists within said first chamber spurious electromagnetic energy substantially all falling within a determinable frequency spectrum having a known upper frequency limit which is substantially below a frequency corresponding to the longest wavelength within the infrared radiation spectrum but within which determinable frequency spectrum fall frequency values substantially fully definitive of said signal intelligence, said apparatus comprising:

a plate of magnetic material for intimately contacting the isolating wall and completely covering an aperture conditionally formed therein;

at least one tubular electromagnetic waveguide passing transversely through and in intimate contact with said plate, said waveguide being dimensioned so as to have a cut-off frequency corresponding to a wavelength substantially longer than the longest wavelength within the infrared radiation spectrum but shorter than that corresponding to the upper frequency limit of said spurious electromagnetic energy;

a source of electromagnetic energy falling within a frequency spectrum embracing frequency values all of which are substantially above the cut-off frequency of said waveguide, said source being positioned at one extremity of said waveguide for directing energy emitted thereby to the other extremity of said waveguide;

means for modulating in accordance with said signal intelligence the energy which is directed from said source to said other extremity of said waveguide; and means positioned at said other extremity of said waveguide and responsive to said modulated energy to develop an electrical signal representing said signal intelligence.

2. Apparatus according to claim 1, wherein said source of electromagnetic energy comprises a photo-emissive device and wherein said photo-emissive device is inserted a substantial distance into said tubular waveguide from said one extremity thereof.

3. Apparatus according to claim 2, wherein a body of light transmissive material is inserted into said waveguide to enhance the transmission of energy from said photo-emissive device to said other extremity of said waveguide.

4. Apparatus useful for coupling binary signal intelligence from a first chamber to a second chamber, which chambers are substantially electromagnetically isolated from one another by an isolating wall of magnetic material and where there exists within said first chamber spurious electromagnetic energy substantially all falling within a determinable frequency spectrum having a known upper frequency limit which is substantially below a frequency corresponding to the longest wavelength within the infrared radiation spectrum but within which determinable frequency spectrum fall frequency values substantially fully definitive of said signal intelligence, said apparatus comprising:

a plate of magnetic material for intimately contacting the isolating wall and completely covering an aperture conditionally formed therein;

at least one tubular electromagnetic waveguide passing transversely through and in intimate contact with said plate, said waveguide being dimensioned so as to have a cut-off frequency corresponding to a wavelength substantially longer than the longest wavelength within the infrared radiation spectrum but shorter than that corresponding to the upper frequency limit of said spurious electromagnetic energy;

a source of electromagnetic energy falling within a frequency spectrum embracing frequency values all of which are substantially above the cut-off frequency of said waveguide, said source being positioned at one extremity of said waveguide for directing energy emitted thereby to the other extremity of said waveguide;

an amplifier having input terminals adapted to receive a binary electrical signal having a predetermined peak-to-peak amplitude and representing said binary signal intelligence, and output terminals for delivering an output signal;

means forming a part of said amplifier for restricting the amplitude excursions of said output signal between two predetermined amplitude limits in response to input signal excursions having a peak-to-peak amplitude less than said predetermined peak-to-peak amplitude of said binary electrical signal;

means coupled to the output terminals of said amplifier and responsive to the output signal thereof for modulating the energy which is directed from said source to said other extremity of said waveguide; and means positioned at said other extremity of said waveguide and responsive to said modulated energy to develop an electrical signal representing said signal intelligence.

5. Apparatus useful for coupling intelligence, represented by input signals within a known frequency spectrum, from a first chamber to a second chamber, which chambers are separated from one another by a wall of magnetic material having an aperture therein and where there exists within one of said chambers spurious energy falling within said frequency spectrum, said apparatus comprising:

closure means including a housing disposed in and substantially closing said aperture, said housing having a partition therein thus defining first and second compartments; at least one tubular waveguide dimensioned so as to have a lower cut-off frequency above the supper frequency limit of said spectrum projecting through said partition with the first and second extremities thereof respectively terminating in said first and second compartments;

a source of electromagnetic energy of a frequency above said waveguide cut-off frequency, said source being positioned at a first extremity of said waveguide for directing energy emitted thereby to a second extremity of said waveguide;

means for modulating said energy emitted by said source in accordance with said input signals; and means positioned at said second extremity of said waveguide and responsive to said modulated energy for developing an output signal representing said intelligence.

6. The apparatus of claim 5 wherein said source of electromagnetic energy comprises a photo-emissive device.

7. The apparatus of claim 6 including a body of light transmissive material disposed within said waveguide.

8. The apparatus of claim 5 wherein said housing and partition are formed of magnetic material.

9. The apparatus of claim 5 wherein said means for modulating said energy and said means responsive to said modulated energy are comprised of at least one circuit structure; and means supporting said circuit structure in one of said compartments.

References Cited

UNITED STATES PATENTS

| | | | |
|---|---|---|---|
| 2,296,678 | 9/1942 | Linder | 333—82 X |
| 2,487,547 | 11/1949 | Harvey | 174—35 X |
| 3,143,655 | 8/1964 | Strandberg | 250—217 X |
| 3,163,828 | 12/1964 | Fine | 330—29 X |
| 3,200,697 | 8/1965 | Goubau | 88—1 |
| 3,245,002 | 4/1966 | Hall. | |
| 3,245,314 | 4/1966 | Dillon | 250—199 |
| 3,259,015 | 7/1966 | Marcatili | 250—199 X |

OTHER REFERENCES

Gilleo et al.: Electronics, Nov. 22, 1963, pp. 23–27.

Rediker et al.: Electronics, Oct. 5, 1962, pp. 44–45.

ROBERT L. GRIFFIN, *Primary Examiner.*

JOHN W. CALDWELL, *Examiner.*

B. V. SAFOUREK, *Assistant Examiner.*